(12) United States Patent
Mao et al.

(10) Patent No.: US 12,631,556 B2
(45) Date of Patent: May 19, 2026

(54) SAMPLE HOLDER FOR PRISM-BASED ANALYTICAL INSTRUMENTS

(71) Applicant: Mainline Scientific LLC, Malvern, PA (US)

(72) Inventors: Yousheng Mao, Hockessin, DE (US); Shouwen Xu, Shanghai (CN)

(73) Assignee: Mainline Scientific LLC, Malvern, PA (US)

( * ) Notice: Subject to any disclaimer, the term of this patent is extended or adjusted under 35 U.S.C. 154(b) by 845 days.

(21) Appl. No.: 17/963,105

(22) Filed: Oct. 10, 2022

(65) Prior Publication Data

US 2024/0118201 A1     Apr. 11, 2024

(51) Int. Cl.
 *G01N 21/552*     (2014.01)
 *G01N 21/13*      (2006.01)
 *G01N 21/41*      (2006.01)

(52) U.S. Cl.
 CPC ........... *G01N 21/553* (2013.01); *G01N 21/13* (2013.01); *G01N 21/41* (2013.01)

(58) Field of Classification Search
 CPC ....... G01N 21/553; G01N 21/13; G01N 21/41
 USPC ........................................................ 356/246
 See application file for complete search history.

(56) References Cited

FOREIGN PATENT DOCUMENTS

| CN | 110596052 A | * | 12/2019 | .......... G01N 21/553 |
| CN | 210146038 U | * | 3/2020 | |

* cited by examiner

*Primary Examiner* — Sunghee Y Gray
(74) *Attorney, Agent, or Firm* — Don D. Cha; HDC Intellectual Property Law, LLP

(57)     ABSTRACT

The present invention is directed to a removable sample holder for analytical instruments or apparatuses that utilizes a prism. For example, sample devices of the invention can be used in a surface plasmon resonance (SPR) spectroscopy device, a plasmon-waveguided resonance (PWR) spectro-scopic device, as well as other spectroscopy devices known to one skilled in the art that uses a prism. The present invention is also directed to methods for using the same. The sample holder device (100) includes a prism retainer (200) and a sample holder (300). Unlike conventional SPR and PWR instruments that have a built-in sample chamber, the sample holder device (100) of the present invention provides a separate sample chamber that can be readily removed and replaced. Furthermore, by allowing ready replacement of the prism the sample holder device (100) of the invention allows user to fabricate custom sensor chips.

13 Claims, 4 Drawing Sheets

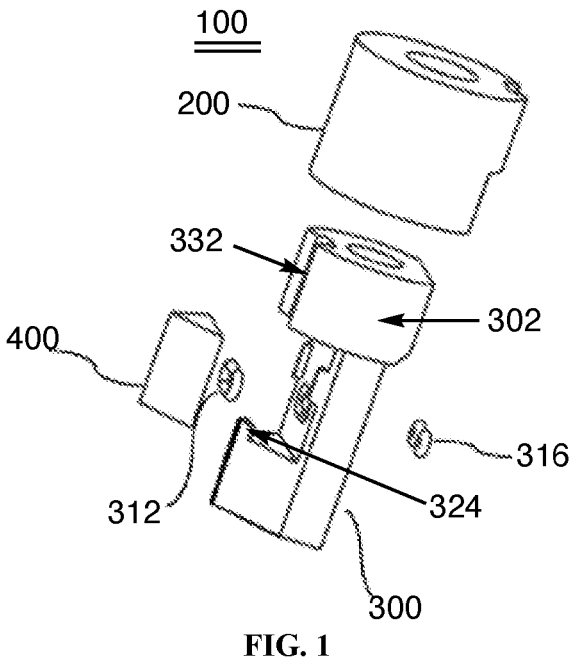
FIG. 1
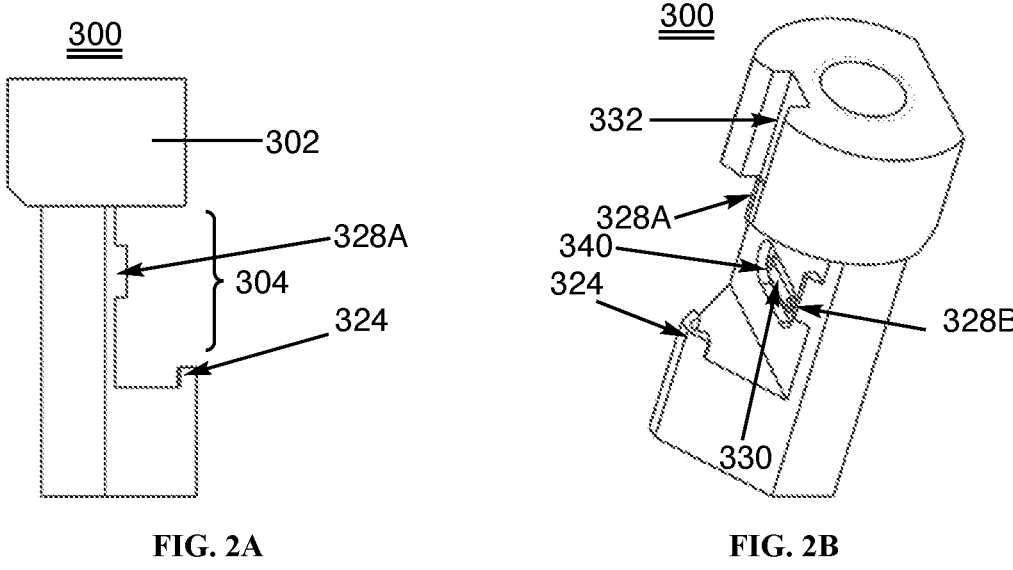
FIG. 2A
FIG. 2B

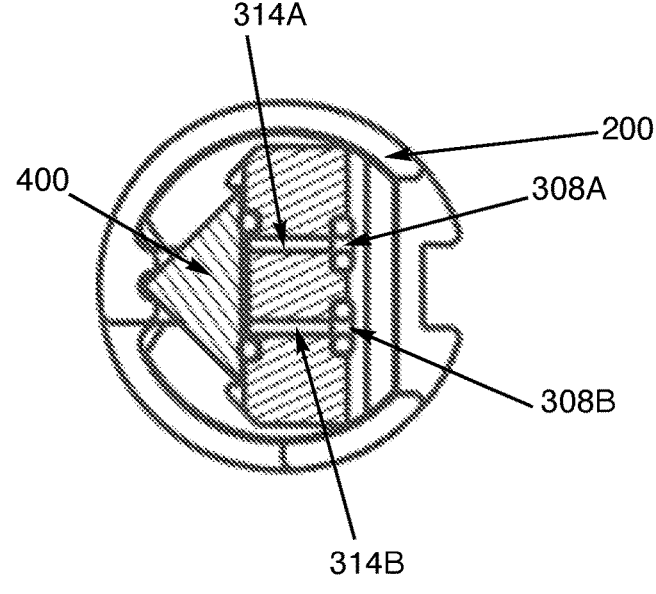
FIG. 3
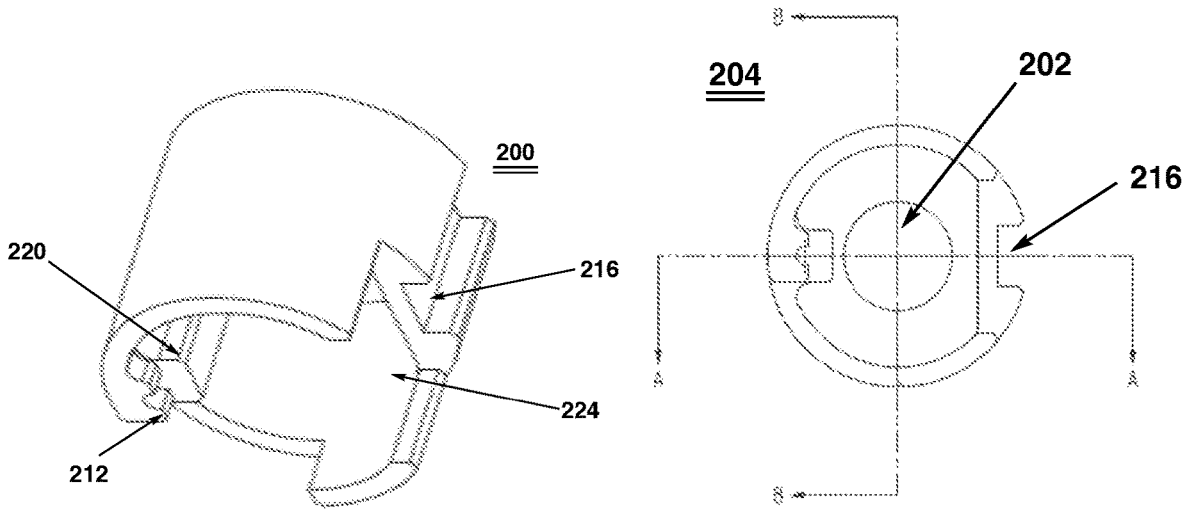
FIG. 4A                    FIG. 4B

SAMPLE HOLDER FOR PRISM-BASED ANALYTICAL INSTRUMENTS

FIELD OF THE INVENTION

The present invention relates to a removable sample holder for a prism-based analytical instrument, such as surface plasmon resonance (SPR) spectroscopy and plasmon-waveguide resonance (PWR) spectroscopy, and methods for using the same.

BACKGROUND OF THE INVENTION

There are numerous analytical instruments that utilize a prism for analyzing a sample. Exemplary prism-based analytical instruments include, but are not limited to, surface plasmon resonance (SPR) spectroscopy and plasmon-waveguide resonance (PWR) spectroscopy. The surface plasmon resonance (SPR) is a resonance phenomenon that occurs by interaction between free electrons of the metal surface and electromagnetic wave (light). SPR is a useful technique for observing small changes in the refractive index (RI). It is a powerful optical detection technique that allows observation of a label-free molecular interaction in real-time. As such, SPR has been used in a wide variety of applications, including in life sciences, electrochemistry, chemical vapor detection, food and environmental safety, chemical and biological sensing, drug development, material science, etc. Some of the key detections that can be made or observed using SPR are binding, kinetics, affinity, specificity, and concentration of a desired ligand, without any need for labels.

Plasmon waveguide resonance (PWR) is a variant of surface plasmon resonance that also utilizes a prism. PWR possesses several advantages compared to SPR. In particular, typical signal peaks in PWR are narrower by almost an order of a magnitude than the comparable SPR. In addition, PWR utilizes the waveguide mode as opposed to the surface plasmon mode used by SPR. PWR also allows light in both polarizations to be utilized as opposed to just one polarization in SPR, and opens the door to measure optical anisotropy of thin layer of materials on the surface and determining the orientation of molecules with high resolution. This is one of the reasons why PWR is ideal for investigating molecular interactions occurring in anisotropic-oriented thin films, such as those in cell membranes.

The classical implementation by which SPR is carried out is known as the Kretschmann configuration. Briefly, a prism is used to introduce light to the glass substrate in a general propagation surface plasmon resonance sensor. The sensor chip (typically comprising a glass substrate coated with a conductor) and the prism need to be closely attached with a thin film or a matching oil. A sensor using surface plasmon resonance includes a propagation surface plasmon resonance sensor and a local surface plasmon resonance. The principle of the propagation surface plasmon resonance sensor is described, for example, in U.S. Pat. No. 7,839,508.

In a typical prism-based analytical instruments, such as SPR, PWR, and the like, a prism is used to introduce light to the glass substrate. Conventional PWR systems do not use disposable sensor chips. Instead, it uses a metallic-plated prism and introduces the samples directly into the prism surface. Thus, in conventional PWR systems the sample compartment and coated prism need to be removed for cleaning after each test.

Some conventional SPR, PWR, and the like systems that have direct sample introduction to prism surface require cleaning of prism and sample compartment after each test to avoid cross contamination. In conventional PWR instruments, cleaning of prism and flow path is typically done manually and is time-consuming. Cleaning the prism and sample compartment also require one to shut down and take apart of the instrument. This makes the system less efficient and impractical for high throughput applications.

The prism-based analytical instruments, such as SPR, PWR, and the like, with disposable sensor chips typically use an optical glue to ensure maximum light coupling between prism and sensor chip. This has many disadvantages. First, applying optical glue is an additional operational step which requires proper technique to ensure consistent quality. This introduces additional variables which could affect the test result. Second, cleaning the optical glue adds complexity in system design and operational workflow. Third, adding operation glue and ensuring appropriate coupling increase the complexity of system design and make the system larger. Other disadvantages of conventional SPR systems include, but are not limited to, (1) the sample compartment and flow path are fixed in the instrument and can only be cleaned by built-in sample flow system, which cannot clean the flow path thoroughly; and (2) over time, the carry-over will build up and may affect the performance. As a result, most existing SPR systems require frequent maintenance to clean the flow system (e.g., weekly or monthly).

In general, all conventional prism-based analytical instruments require a complete shut down and taking apart various components to clean and maintain the sample chamber and the prism. This is both time and labor intensive.

Therefore, there is a need for a sample holder device or apparatus, that can be easily cleaned and/or serviced without leading to a long instrument down time.

SUMMARY OF THE INVENTION

Some aspects of the invention are based on development by the present inventors of an apparatus or device that can be simply loaded into a prism-based analytical instrument, e.g., PWR or SPR system, as a sample compartment. In some embodiments, unlike conventional PWR or SPR systems that require gluing of a prism and a sensor chip prior to operation, sample holder devices or apparatuses of the disclosure do not require any optical glue and can readily be replaced. Accordingly, devices of the invention simplify the operational workflow and increase the test efficiency. Moreover, by eliminating the additional glass slide used in most SPR instruments, devices of the invention also simplify the design of the SPR or PWR instruments, e.g., by eliminating a need to worry about coupling between a sensor chip (e.g., glass slide) and a prism.

Some aspects of the invention provide a sample holder apparatus (100) adapted for use in a surface plasmon resonance (SPR) spectroscopy, plasmon-waveguide resonance (PWR) spectroscopy, or any prism-based analytical instrument. The sample holder apparatus (100) of the invention incudes a sample holder (300) that is optionally removably connected to a prism retainer (200). The sample holder (300) comprises:

a prism retainer joining region (302);
    a prism compartment (304) comprising:
        a first protuberance (324) adapted for holding a prism (400) within said prism compartment (304); and
        at least one second protuberance (328A) adapted for holding the prism (400) within said prism compartment (304);
    a fluid inlet port (308A);

a fluid outlet port (308B); and an annular groove (340) adapted to receive an annular seal to prevent leakage of a fluid from said sample holder (300) when said sample holder (300) and the prism (400) are mated together.

The prism retainer (200) includes a top portion (204); and a bottom portion (208) comprising a slotted opening (212) that is adapted to allow insertion of the prism (400) and holding the prism (400) in place during operation.

In some embodiments, the prism retainer (200) further comprises a fluid influx/efflux notch or a slotted opening (224) adapted to allow access to said fluid inlet port (308A) and said fluid outlet port (308B) of said sample holder (300) when said prism retainer (200) and said sample holder (300) are mated.

Yet in other embodiments, the sample holder (300) further comprises a complementary joining element (332). Still in other embodiments, the prism retainer (200) further comprises a joining element (220) that is configured to join or mate with the complementary joining element (332) of the sample holder (300), thereby joining or mating the prism retainer (200) with the sample holder (300). In some instances, one of the joining element (220) and the complementary joining element (332) is a protuberance and the other is a channel that is adapted to receive and mate with said protuberance.

In further embodiments, the prism retainer (200) further comprises an instrument joining or mating groove (216) that is adapted to join or mate with the prism-based analytical instrument. This mating of the prism retainer (200) to the instrument allows the test sample to be held in place without any manual or outside mechanism.

Still in other embodiments, the prism retainer (200) further comprises a slotted opening (212) that is adapted to allow insertion of a prism and holding a prism in place during operation.

Yet in other embodiments, the sample holder apparatus (100) further comprises a removably inserted seal (312) within said annular cavity (340). The presence of this seal (312) prevents a fluid sample from leaking out within the interface of the sample holder device (300) and the prism (400).

Another aspect of the disclosure provides a sample holder device (100) that includes a prism retainer (200) that is operatively attached to a sample holder (300). In this aspect of the disclosure, said prism retainer (200) comprises:

a top portion (204);

a bottom portion (208) comprising a slotted opening (212) that is adapted to allow insertion of a prism (400) and holding the prism (400) in place during operation; and a joining element (220);

and the sample holder (300) comprises:

a prism retainer joining region (302) comprising a complementary joining element (332), such that said joining element (220) and said complementary joining element (332) are configured to join said prism retainer (200) to said sample holder (300);

a prism compartment (304) comprising:

a first protuberance (324) adapted for holding the prism (400) within said prism compartment (304); and at least one second protuberance (328A) adapted for holding the prism (400) within said prism compartment (304);

a fluid inlet port (308A);

a fluid outlet port (308B); and an annular groove (340) adapted to receive an annular seal (312) to prevent leakage of a fluid from said sample holder (300) when said sample holder (300) and the prism (400) are mated together.

In some embodiments, the prism retainer (200) further comprises an instrument joining or mating groove (216) that is adapted to join or mate with the prism-based analytical instrument.

Yet in other embodiments, one of said joining element (220) and said complementary joining element (332) is a protuberance and the other is a channel adapted to receive said protuberance, thereby joining or mating the prism retainer (200) to the sample holder (300).

Still another aspect of the disclosure provides a method for analyzing a test sample using a prism-based analytical instrument using any of the sample holder apparatus or device disclosed herein. In some embodiments, the method includes:

placing a prism (400) into a prism compartment (304) of a sample holder device (100) of claim 1, wherein said prism (400) is coated with a thin-film of metal, and wherein said thin-film of metal comprises a binding molecule;

placing said sample holder device (100) on to the prism-based analytical instrument;

adding the test sample to sample chamber (330) via a fluid inlet port (308A); and analyzing the test sample using the prism-based analytical instrument.

In some embodiments, the prism-based analytical instrument is a surface plasmon resonance (SPR) spectroscopy or plasmon-waveguide resonance spectroscopy.

BRIEF DESCRIPTION OF THE DRAWINGS

FIG. 1 is a schematic illustration of one embodiment of a sample holder device (100) of the invention that includes a prism retainer (200) and a sample holder (300).

FIG. 2A is a side-view of one embodiment of a sample holder device (300) of the invention.

FIG. 2B is a perspective view of one embodiment of a sample holder device (300) of the invention.

FIG. 3 is a cut-away top view of one embodiment of a sample holder device (100) in which the prism retainer (200) is mated with the sample holder (300).

FIG. 4A is a perspective view of one embodiment of a prism retainer (200) of the invention.

FIG. 4B is a top view of one embodiment of a prism retainer (200) of the invention.

DETAILED DESCRIPTION OF THE INVENTION

The present invention will be described with regard to the accompanying drawings, which assist in illustrating various features of the invention. In this regard, the present invention relates to a sample holder device for spectroscopy instruments or apparatuses. The sample device of the invention is applicable for use in any instrument or spectroscopy apparatus that utilizes a prism and an electromagnetic radiation, such as but not limited to, plasmon-waveguided resonance (PWR) spectroscopy and surface plasmon resonance (SPR) spectroscopy. That is, in general the invention relates to a sample holder device for an analytical instrument that requires a prism and a sample chamber. For the sake of clarity and brevity, the present invention will now be described in reference to a sample holder for an SPR spectroscopy device. However, it should be appreciated that the scope of the invention is not limited to a sample holder for an SPR spectroscopy device. In fact, as stated above, methods and devices of the invention can be used generally in any device that requires a prism that is operationally connected or attached to a sample chamber, including but not limited to, PWR spectroscopy devices. Discussion of a sample holder for use in SPR apparatuses is provided solely for the purpose of illustrating the practice of the invention and do not constitute limitations on the scope thereof.

Figures 2C, 2D, 2E, 2F:
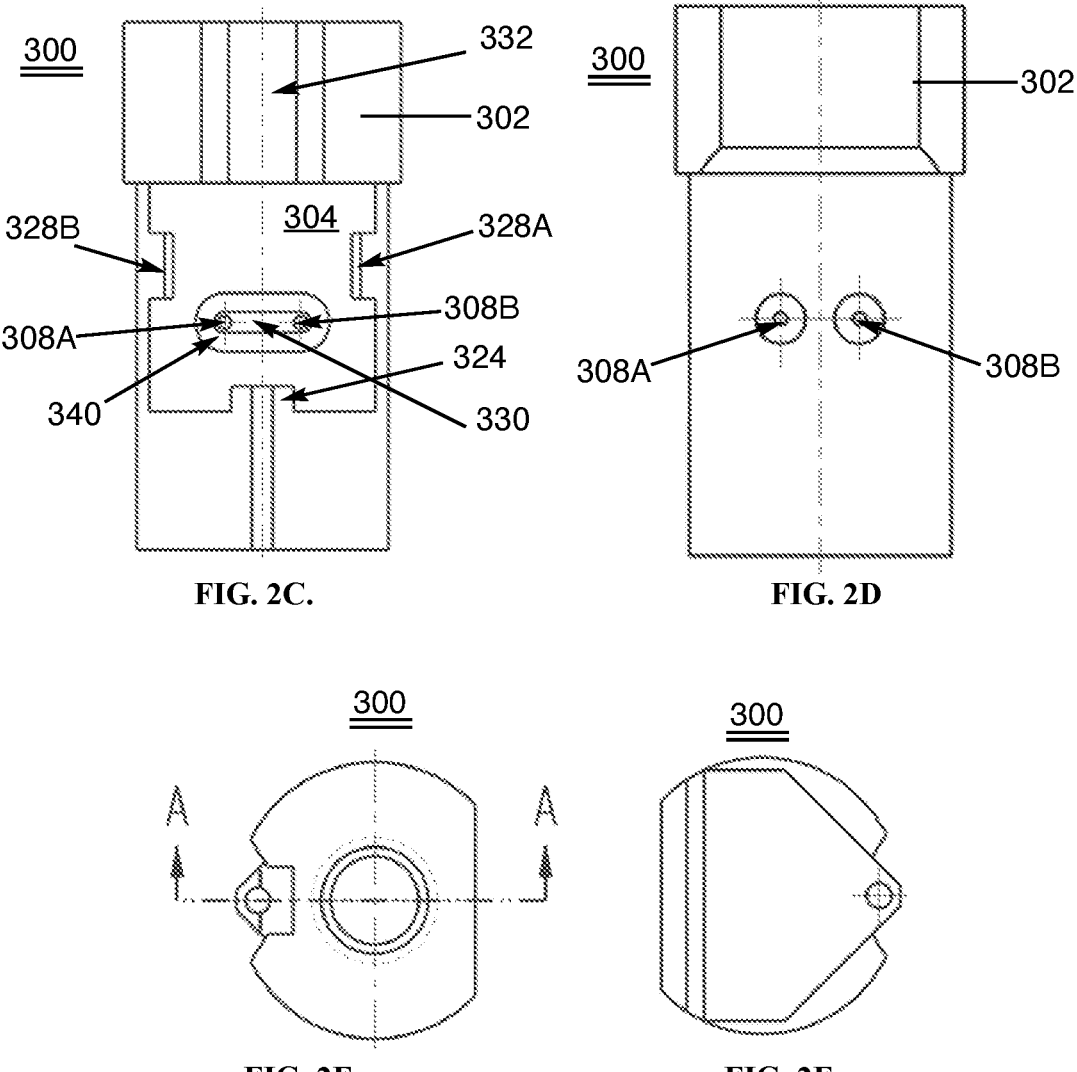
FIG. 2C is a front view of one embodiment of a sample holder device (300) of the invention.
FIG. 2D is a back view of one embodiment of a sample holder device (300) of the invention.
FIG. 2E is a top view of one embodiment of a sample holder device (300) of the invention.
FIG. 2F is a bottom of one embodiment of a sample holder device (300) of the invention.
Figures 4C, 4D:
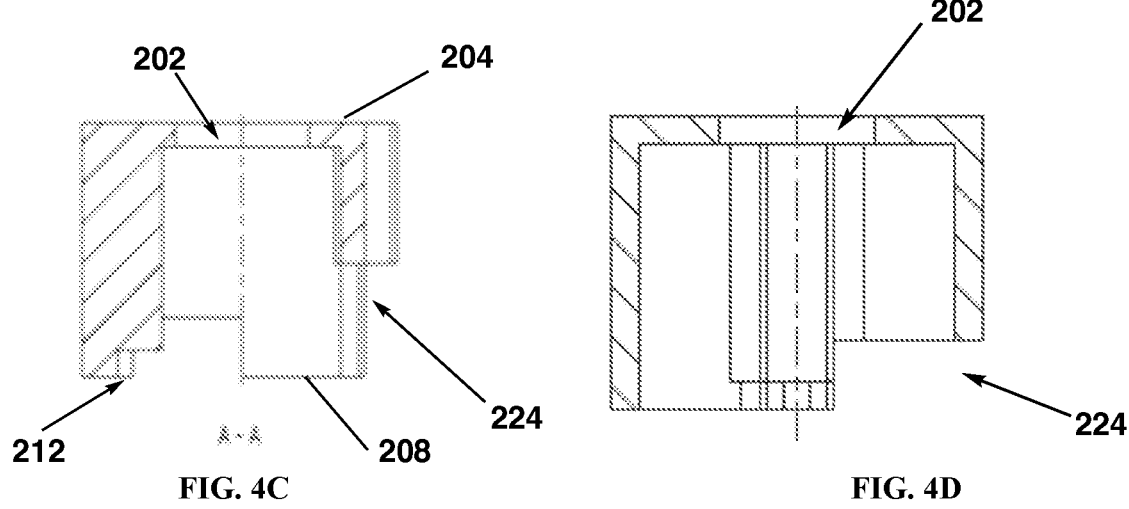
FIG. 4C is a cross-sectional view of the prism retainer (200) of FIG. 4B along lines A-A.
FIG. 4D is a cross-sectional view of the prism retainer (200) of FIG. 4B along lines B-B.

One particular embodiment of a sample holder for SPR or PWR is generally illustrated in FIGS. 1-4D. It should be appreciated that this particular embodiment of the invention is provided solely for the purpose of illustrating the practice of the invention and does not constitute any limitations on the scope thereof.

As shown in FIGS. 1-4D, a sample holder device (100) for plasmon-waveguided resonance (PWR) spectroscopic device or surface plasmon resonance (SPR) spectroscopy comprises a prism retainer (200) that is adapted for affixing a prism (400) in place and a sample compartment base or a sample holder (300). While not shown, a handle can also be present that is attached or is removably attached to the prism retainer (200). The handle can be attached to or removably attached to the prism retainer (200) at optionally present handle attaching orifice (202).

Unlike the device disclosed in a commonly assigned U.S. patent application Ser. No. 17/738,903, filed May 6, 2022, entitled "Sample Holder for Surface Plasmon Resonance and Plasmon-Waveguide Resonance Apparatus" (the '903 Application), the sample holder device of the present disclosure does not include a sample injection port. Thus, unlike the device disclosed in the '903 Application, a sample to be tested is introduced through a fluid inlet port (308A). It should be appreciated that either the port 308A or 308B can be an inlet port as long as the other is used as an outlet port. Thus, elimination of a need for a separate sample injection port device greatly simplifies the overall manufacturing process, time, and cost.

Referring in particular to FIGS. 2A-2F, the sample compartment base or sample holder device (300) includes a prism compartment (304). This prism compartment (304) allows placement of the prism (400) within the sample holder (300). The sample holder (300) also includes a fluid inlet port (308A) and a fluid outlet port (308B). As stated above, the fluid inlet and outlet ports can be interchanged. A test sample can be introduced via the fluid inlet port (308A). To prevent leakage, the fluid inlet port (308A) and the fluid outlet port (308B) can be fitted with sealing gaskets (FIG. 1 element 316) (e.g., a septum, or other sealing means). The sample holder (300) can also include an annular groove (340) that interfaces to the prism (400). This allows the sample that is introduced through the fluid inlet port (308A) to be in intimate contact with the prism (400), thereby allowing a desired analysis to be performed by the prism-based analytical instrument. To prevent any leakage of fluid within the interface of the prism (400) and the sample holder (300) the annular groove (340) can be fitted with a sealing gasket (312). The sealing gasket can be a seal such as an o-ring (312), FIG. 1, or other device can be inserted into the annular cavity (340) to provide sealing means between the prism (400) and the sample holder (300).

The fluid inlet port (308A) of the sample holder (300) can also be used to introduce a solution to the interface of the prism (400) and the sample holder (300). The fluid outlet port (308B) allows removal of the solution. The sample holder (300) also includes a prism retainer compartment (304) and a protuberance (324) that is adapted to hold a prism in place during operation. The protuberance (324) along with a prism retainer (200) infra aids in holding the prism (400) in place during operation. In some embodiments, the sample holder (300) includes at least one other protuberance (328A and/or 328B) that is adapted to further aid in holding the prism (400) within said prism compartment (304).

In some embodiments, the sample holder (300) also includes a complementary joining element (332) that aids in firmly mating or joining of the sample holder (300) to the prism retainer (200). This complementary joining element (332) provides a means for guiding and properly placing and seating or joining the prism retainer (200) onto the sample holder (300).

The sample holder device (100) also includes a prism retainer (200). FIGS. 4A-4D. The prism retainer (200) can also include a handle that can be either permanently or removably attached, for example, to the handle orifice (202). The prism retainer (200) includes a top portion (204); and a bottom portion (208) comprising a slotted opening or a notch (212) that is adapted to allow insertion of a prism (400) and holding a prism (400) in place during operation. The prism retainer (200) also includes a fluid influx/efflux notch or a slotted opening (224) on the opposite side of the prism retainer slotted opening (212). The fluid influx/efflux notch (224) allows attachment of a solvent or a fluid distribution system. The fluid influx/efflux notch (224) allows access to the fluid inlet and fluid outlet ports (308A and 308B) of the sample holder (300). In this manner, a fluid, such as a test sample solution, a solvent, a buffer solution, or a cleaning solution can be introduced to the interface of the prism (400) and the sample holder (300). The fluid inlet and outlet ports (308A and 308B) of the sample holder (300) can be recessed relative to the backside of the sample holder (300). This allows insertion of a seal such as an o-ring or other sealing devices (316) known to one skilled in the art, see FIG. 1, to ensure tight seals between the sample holder (300) and a solution influx and efflux.

In some embodiments, the prism retainer (200) includes a joining element (220) that is configured to join or mate with the complementary joining element (332) of the sample holder (300). This joining element and the complementary joining element provide ease of alignment as well as a means for securely joining or mating the prism retainer (200) to the sample holder (300). In some embodiments, the joining element (220) is a protuberance and the complementary joining element (332) is a channel. However, it should be appreciated that the joining element (220) and the complementary joining element (332) can be reversed, i.e., the complementary joining element (332) is a protuberance and the joining element (220) is a channel. It should also be appreciated that the joining element (220) and the complementary joining element (332) need not be a protuberance and a channel. They can be any mechanism known to one of ordinary skill that allows joining or mating of two devices. In addition, the prism retainer (200) can be attached to the sample holder (300). For example, by placing a sliding preventing element within the prism retainer (200) and/or the sample holder (300), one can limit the amount of travel or movement of the prism retainer (200) relative to the sample holder (300). In this manner, a complete removal or separation of the prism retainer (200) from the sample holder (300) is prevented.

Yet in other embodiments, the prism retainer (200) can also include sample holder guide channel or groove (216) that is adapted to mate with a sample place holder of an PWR or the SPR apparatus (not shown). This allows one to affix the sample holder device (100) within the PWR or the SPR apparatus during operation.

The sample holder device (100) can be loaded or placed into a PWR or SPR apparatus as a sensor chip. Briefly, the sample holder device (100) is loaded or placed on a PWR or SPR apparatus to start a test. Unlike a conventional sample holder, the sample holder device (100) of the invention requires no optical glue. This simplifies the operational workflow and increases the test efficiency. In addition, the sample holder device (100) of the invention eliminates the need for additional sample glass slides used in most SPR instruments further allowing simplification of the design of the instrument as there is no need to worry about coupling between a sample glass slide and prism.

The sample holder device (100) includes a sample holder (300) that has integrated sample chamber (330) and fluid flow paths (i.e., fluid inlet and outlet ports 308A and 308B). A test sample may be introduced through the fluid inlet port (308A) or it can be introduced via a sample injection port that is part of the PWR or SPR apparatus. As can be seen, when a new sample holder device (100) is loaded into the PWR or SPR apparatus, some portion of the sample flow path is replaced (i.e., fluid inlet and outlet ports), thereby significantly reducing a possibility of cross contamination from a previous test sample. This design also significantly reduces the maintenance need to the PWR or SPR apparatus or instrument flow path and down time. In addition, the sample holder device (100) of the invention simplifies the system design. For example, use of the sample holder device (100) of the invention eliminates the complicated hardware and software design for PWR or SPR instrument cleaning.

In most conventional SPR and PWR instruments or apparatuses, the sample flow path is built in the instruments and can only be cleaned through a flushing process run by built-in sample flow system. Such a process cannot thoroughly clean the flow path. Over time, the minute carry-over samples from previously test samples will build up and affect the performance and/or the result of the SPR or PWR analysis. As a result, most conventional SPR and PWR instruments require frequent maintenance to thoroughly clean the flow system (e.g., weekly or monthly). Since the sample holder device (100) of the invention can be completely disassembled, thoroughly cleaning every part of the unit is possible (e.g., using ultrasonic cleaning equipment, etc.). This simple maintenance allows the sample holder device (100) of the invention to be reused and significantly reduces potential carry-over from previous test samples. Ability to reuse the sample holder device (100) significantly reduces the cost per test.

Moreover, since the sample holder device (100) of the invention can be easily assembled and disassembled, every component of the unit can be separately removed for cleaning or maintenance. This makes the sample holder device (100) of the invention reusable and extends the life of the device. Even when some parts the sample holder device (100) of the invention wear out after multiple cycles of cleaning (e.g., the prism may need re-coating), simply replacing that particular part instead of replacing the entire device significantly reduces the overall cost and down-time of the SPR or PWR apparatus. In addition, by allowing replacement of only those parts requiring replacement, the sample holder device (100) of the invention is also more environmentally friendly compared to conventional SPR or PWR instruments.

Furthermore, ease of assembly/disassembly also provides flexibility in sample testing applications. The prism (400) can be easily taken out and the surface of the prism (400) can be pre-treated (e.g., immobilize a specific antigen on the surface) before the test for different application purposes. This makes this chip (i.e., the prism (400)) more flexible and can be used for widely different applications. Most current state of the art sensor chips used in SPR are pre-coated in the manufacturing phase. This pre-coating during the manufacturing makes it rather difficult to take glass slide out of a sensor chip for additional surface treatment once the chip is fabricated. This makes it impossible to custom treat the sensor chip by the user.

Integrating the coated-prism (400) as a separate unit from the sample holder (300) makes it possible to use the sample holder device (100) as a consumable device. Moreover, the sample holder guide channel or groove (216) that is present in the sample holder device (100) makes it easy to load or unload the sample holder device (100) from the SPR or PWR instrument.

A portion of the sample flow path (e.g., the fluid inlet and outlet ports 308A and 308B, respectively) is integrated into the sample holder device (100) via the sample holder (300). Since the sample holder (300) can be easily removed and replaced from the sample holder device (100), it can be replaced from one sample test to another. This eliminates a need to clean the fluid flow path associated with fluid inlet and outlet ports 308A and 308B, respectively.

The sample holder device (100) of the invention is designed to allow the prism (400) to be easily positioned and locked for sample testing. This design makes the prism (400) to be easily removed and replaced.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. All references cited herein are incorporated by reference in their entirety.

What is claimed is:

1. A sample holder apparatus (100) adapted for use in a surface plasmon resonance (SPR) spectroscopy, or plasmon-waveguide resonance (PWR) spectroscopy, said sample holder apparatus (100) comprising a sample holder (300) that is removably connected to a prism retainer (200), wherein
    (i) said sample holder (300) comprises:
        a prism retainer joining region (302);
        a prism compartment (304) comprising:

a first protuberance (324) adapted for holding a prism (400) within said prism compartment (304); and at least one second protuberance (328A) adapted for holding the prism (400) within said prism compartment (304);

a fluid inlet port (308A);

a fluid outlet port (308B); and an annular groove (340) adapted to receive an annular seal to prevent leakage of a fluid from said sample holder (300) when said sample holder (300) and the prism (400) are mated together; and (ii) said prism retainer (200) comprises:

a top portion (204); and a bottom portion (208) comprising a slotted opening (212) that is adapted to allow insertion of the prism (400) and holding the prism (400) in place during operation.

2. The sample holder apparatus (100) of claim 1, wherein said prism retainer (200) further comprises a fluid influx/efflux notch or a slotted opening (224) adapted to allow access to said fluid inlet port (308A) and said fluid outlet port (308B) of said sample holder (300) when said prism retainer (200) and said sample holder (300) are mated.

3. The sample holder apparatus (100) of claim 1, wherein said sample holder (300) further comprises a complementary joining element (332).

4. The sample holder apparatus (100) of claim 3, wherein said prism retainer (200) further comprises a joining element (220) that is configured to join or mate with said complementary joining element (332) of said sample holder (300), thereby joining said prism retainer (200) with said sample holder (300).

5. The sample holder apparatus (100) of claim 4, wherein one of said joining element (220) and said complementary joining element (332) is a protuberance and the other is a channel adapted to receive said protuberance.

6. The sample holder apparatus (100) of claim 1, wherein said prism retainer (200) further comprises an instrument joining or mating groove (216) that is adapted to join or mate with the prism-based analytical instrument.

7. The sample holder apparatus (100) of claim 1, wherein said prism retainer (200) further comprises a slotted opening (212) that is adapted to allow insertion of a prism and holding a prism in place during operation.

8. The sample holder apparatus (100) of claim 1 further comprising a removably inserted seal (312) within said annular cavity (340).

9. A method for analyzing a test sample using a prism-based analytical instrument, said method comprising:

placing a prism (400) into a prism compartment (304) of a sample holder device (100) of claim 1, wherein said prism (400) is coated with a thin-film of metal, and wherein said thin-film of metal comprises a binding molecule;

placing said sample holder device (100) on to the prism-based analytical instrument;

adding the test sample to sample chamber (330) via a fluid inlet port (308A); and analyzing the test sample using the prism-based analytical instrument.

10. The method of claim 9, wherein said prism-based analytical instrument is a surface plasmon resonance (SPR) spectroscopy or plasmon-waveguide resonance spectroscopy.

11. A sample holder device (100) for plasmon-wave-guided resonance (PWR) spectroscopy, or a surface plasmon resonance (SPR) spectroscopy, said sample holder device comprising a prism retainer (200) that is operatively attached to a sample holder (300), wherein (i) said prism retainer (200) comprises:

a top portion (204);

a bottom portion (208) comprising a slotted opening (212) that is adapted to allow insertion of a prism (400) and holding the prism (400) in place during operation; and a joining element (220), (ii) said sample holder (300) comprises:

a prism retainer joining region (302) comprising a complementary joining element (332), such that said joining element (220) and said complementary joining element (332) are configured to join said prism retainer (200) to said sample holder (300);

a prism compartment (304) comprising:

a first protuberance (324) adapted for holding the prism (400) within said prism compartment (304); and at least one second protuberance (328A) adapted for holding the prism (400) within said prism compartment (304);

a fluid inlet port (308A);

a fluid outlet port (308B); and an annular groove (340) adapted to receive an annular seal (312) to prevent leakage of a fluid from said sample holder (300) when said sample holder (300) and the prism (400) are mated together.

12. The sample holder device (100) of claim 11, wherein said prism retainer (200) further comprises an instrument joining or mating groove (216) that is adapted to join or mate with the prism-based analytical instrument.

13. The sample holder device (100) of claim 11, wherein one of said joining element (220) and said complementary joining element (332) is a protuberance and the other is a channel adapted to receive said protuberance.

* * * * *